(12) United States Patent
Boehl

(10) Patent No.: US 9,325,494 B2
(45) Date of Patent: Apr. 26, 2016

(54) METHOD FOR GENERATING A BIT VECTOR

(75) Inventor: Eberhard Boehl, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 637 days.

(21) Appl. No.: 13/099,901

(22) Filed: May 3, 2011

(65) Prior Publication Data

US 2011/0302426 A1  Dec. 8, 2011

(30) Foreign Application Priority Data

Jun. 7, 2010 (DE) .......................... 10 2010 029 735

(51) Int. Cl.
*G06F 11/30* (2006.01)
*H04L 9/00* (2006.01)

(52) U.S. Cl.
CPC ........... *H04L 9/003* (2013.01); *H04L 2209/046* (2013.01)

(58) Field of Classification Search
CPC .......................... H04L 2209/046; H04L 9/003
USPC ................. 713/168, 171, 176, 181, 193, 194; 380/28, 29, 37, 46
See application file for complete search history.

(56) References Cited

U.S. PATENT DOCUMENTS

| 5,963,984 A * | 10/1999 | Garibay et al. ................ 711/206 |
| 6,327,661 B1 | 12/2001 | Kocher et al. |
| 6,510,518 B1 * | 1/2003 | Jaffe et al. ...................... 713/168 |
| 2003/0048903 A1 * | 3/2003 | Ito ........................... H04L 9/003 380/263 |
| 2008/0143561 A1 | 6/2008 | Miyato et al. |

FOREIGN PATENT DOCUMENTS

CN     101268654 A     9/2008

OTHER PUBLICATIONS

Mangard, Oswald and Popp, "Power Analysis Attacks," Springer 2007.

* cited by examiner

*Primary Examiner* — Jeffery Williams
*Assistant Examiner* — Suman Debnath
(74) *Attorney, Agent, or Firm* — Kenyon & Kenyon LLP

(57) ABSTRACT

A method and a circuit configuration for generating a bit vector are described. At least two configurations, each having state machines of the same design, are used, to whose inputs an input signal is sent and which generate an output signal as a function of their state, each state machine always having a different state than the other state machine of one configuration, so that the bit vector is generated by a linear gating of the output signals of the state machines of different configurations.

17 Claims, 5 Drawing Sheets

METHOD FOR GENERATING A BIT VECTOR

RELATED APPLICATION INFORMATION

The present application claims priority to and the benefit of German patent application no. 10 2010 029 735.6, which was filed in Germany on Jun. 7, 2010, the disclosure of which is incorporated herein by reference.

FIELD OF THE INVENTION

The present invention relates to a method for generating a bit vector and a circuit configuration for performing the method.

BACKGROUND INFORMATION

Cryptographic devices and cryptologic algorithms are exposed to attacks in which protected data are to be read or manipulated. With the encryption methods customary today, for example, the Advanced Encryption Standard (AES), the keys used are not ascertainable by trial and error (so-called brute force attacks), even using high-speed computer technology, because the keys are at least 128 bits long. An attacker will therefore also investigate the side effects of an implementation, such as the variation of the power consumption over time, the duration or electromagnetic emission of a circuit in encryption operations. These attacks are referred to as side channel attacks, because they are not aimed directly at the function.

These side channel attacks utilize the physical implementation of a cryptosystem in a device. The control unit is then observed using cryptographic functions in implementation of the cryptologic algorithms to find correlations between the observed data and the hypotheses for the private key.

There are numerous side channel attacks such as those discussed in the publication by Mangard, Oswald and Popp in "Power Analysis Attacks," Springer 2007. The successful attack on the private key of the AES may be implemented in practical terms by using differential power analysis (DPA) in particular.

In this method, the power consumption by a microprocessor during cryptographic calculations is recorded and traces of the power consumption are compared with hypotheses by using statistical methods.

There are believed to be methods which make DPA difficult intervene in the algorithm itself. In masking, the operations are performed using randomly varied operands; as a result, the random value is then recalculated, which means that random chance does not affect the result. Another possibility is the so-called hiding, in which an attempt is made to compensate for high-low transitions through corresponding low-high transitions.

U.S. Pat. No. 6,510,518 B1 discusses a cryptographic method for so-called smartcards and other cryptologic systems. This document also describes a method for using a private key for cryptographic processing of a message. The received message is processed in a hardware unit, where a plurality of suboperations is performed. Each suboperation transmits an input to an output via an intermediate stage, performing a number of state transformations, which in turn does not depend on the message to be processed and the key used.

U.S. Pat. No. 6,327,661 B1 discusses a method for protecting cryptologic systems from attacks from the outside. The quantity of usable information is reduced in this method. For this purpose, unpredictable data or information are/is included in the cryptographic processing. Implementations using different techniques are described, for example, a reduction in signal/noise ratio. The techniques presented here may be implemented in hardware or software, may use a combination of digital and analog techniques, and may be used in a plurality of cryptologic devices.

SUMMARY OF THE INVENTION

Against this background, a method for generating a bit vector having the features described herein and a circuit configuration for generating a bit vector as described herein. Embodiments are derived from the further description herein and the drawings.

Contrary to the related art, the proposed method does not intervene in the algorithms and therefore may be used for any cryptographic methods. Furthermore, it requires less additional hardware and processing time. The method proposed here is suitable for both encryption and decryption. Masks may be generated in advance. Each of these may be used for multiple cryptographic operations. Mask generation therefore does not reduce the efficiency of these operations, which is why this method is a suitable measure against side channel attacks.

In one embodiment, a circuit configuration is thus provided for generating a bit vector (mask) from predefined input signals for masking at least one private key and/or the data (plain text, cipher text) of a cryptographic operation to protect such cryptographic operation from side channel attacks such as DPA (differential power analysis) attacks. The circuit configuration has at least two configurations, each having m state machines of the same design and triggered in the same way, each having n relevant memory elements (i.e., determining the state of the state machine), where $m=2^n$. These m state machines are initialized at the start of mask generation or generation of the bit vector, each having a different initial state, and all these state machines in a configuration connected to the same input signals in the same way, at least one output signal of each configuration being used to form such a bit vector. Values m and thus also n may be different for the two configurations.

Counter bits from a first counter may also be included. This counter counts the number of input vectors applied so far.

In another embodiment, the m state machines used are constructed in a configuration so that when all these state machines having m different states are initialized, there is assurance that all state machines will always have different states as a function of any input signals.

In addition, it is possible to provide that switching signals y are formed from the input signals. The switching signals are used in particular to alter the transmission function of the state machines in such a way that switching between two simple linear transmission functions is performed as a function of the input signals. This switching should occur, if possible, in different possible manners in the different configurations.

Additional parity bits of the input signals ensure that switching is performed in the state machines at least once between the different linear transmission functions and thus there is a transmission function that is nonlinear on the whole. A nonlinear transmission function is necessary to be able to make the generated bit vector not calculable. Otherwise, brute force attacks would be more readily possible.

It is also possible to provide for switching signals y to enter into a second counter value z in a weighted manner and for the magnitude of this weight to vary according to the configuration and the first counter value.

In one embodiment of the method, the contents of the state machines (states) are interchanged within one configuration as a function of second counter value z. This interchange may be a rotation of the states within this configuration. Counter values z and thus the rotations are different for different configurations because switching values y and the weights are also different.

In one possible embodiment of the circuit configuration, the memory elements of the state machines are constructed from two parts (master/slave), which are situated in succession, both of which are erasable separately (reset value 0 or 1, but the same for all masters and slaves) as well as capable of receiving data independently of one another. To interchange the states, they are typically triggered in such a way that first the masters are erased, then the masters accept the applied input information (from another state), whereupon the slaves are erased, and next the slaves accept the content of the masters. This method is necessary because otherwise in a simple interchange (or rotation), the power consumption in the interchange depends on how many 0-1 and 1-0 transitions there are in the interchange. In the proposed method, there are exactly m*n/2 1-0 transitions in erasing the masters to the value 0 in one configuration and there are exactly m*n/2 0-1 transitions in loading the new values. This number of transitions is independent of the particular state.

The power consumption is therefore always the same and therefore is not observable or attackable. The rotation or interchange of states is necessary, so that the individual bits of the generated bit vector on the average depend, if possible, on all or at least many of the n*m bits of the initial state.

In addition, the bit vector (mask) may be formed by different configurations from gating different outputs of different state machines of different configurations. Furthermore, the operands of such a gating operation may be balanced, i.e., guided to the gating element using the same line length and/or capacitance.

In another possible embodiment of the circuit configuration and the method, the gating operations are performed partially in succession and therefore the states of the state machines are interchanged after each partial operation, so that the interchange is performed by simultaneous and separate erasing and subsequent simultaneous writing of the master and slave elements of all memory elements.

In addition, it is possible for the outputs of all state machines not connected to a gating element to be connected to a load element and for this load element to represent the same electrical response (for example, capacitance value) as the load at outputs connected to the gating elements.

Furthermore, during an interchange operation of the states and also during the processing of the input signals, the signals leading to the gating and load elements may all be set at the same fixed value (0 or 1).

In yet another embodiment, the input signals used to generate the bit vector are at least partially unpredictable (random) values and/or they depend on a counter. Parity bits are then generated from these input signals and inserted into the signal sequence after a predefinable number of input bits. In another embodiment, the number of input bits between two parity bits is odd, and the parity bit itself is odd, i.e., the sum of the ones in the particular input bits and the corresponding parity bit is odd.

The circuit configuration presented here may be embodied in such a way that a plurality of configurations, each having $m=2^n$ state machines, each having n relevant memory elements, is used, and different configurations have the same or different initial states and/or are connected to the same or different configuration and/or inversion of the input signals.

In another possible specific embodiment of the circuit configuration, it is provided that at least one configuration having $m=2^n$ state machines having n relevant memory elements and at least one configuration having $p=2^q$ state machines, each having q relevant memory elements, are used. Each of these p state machines has a different initial state and is connected either directly or indirectly to at least one input signal which is the same as the m state machines. However, any number of other input signals may also be used.

To ensure the same probability for a 1 and a 0 for the generated bit vector for each individual bit, bits of one configuration are gated with bits of at least one second configuration. The gating operation should advantageously be linear (antivalence, equivalence), which is equivalent to EXOR or EXNOR.

Additional advantages and embodiments of the exemplary embodiments and/or exemplary methods of the present invention are derived from the description and the accompanying drawings.

It is self-evident that the features mentioned above and those yet to be explained below may be used not only in the particular combination indicated but also in other combinations or alone without going beyond the scope of the present invention.

DETAILED DESCRIPTION

Figure 1:
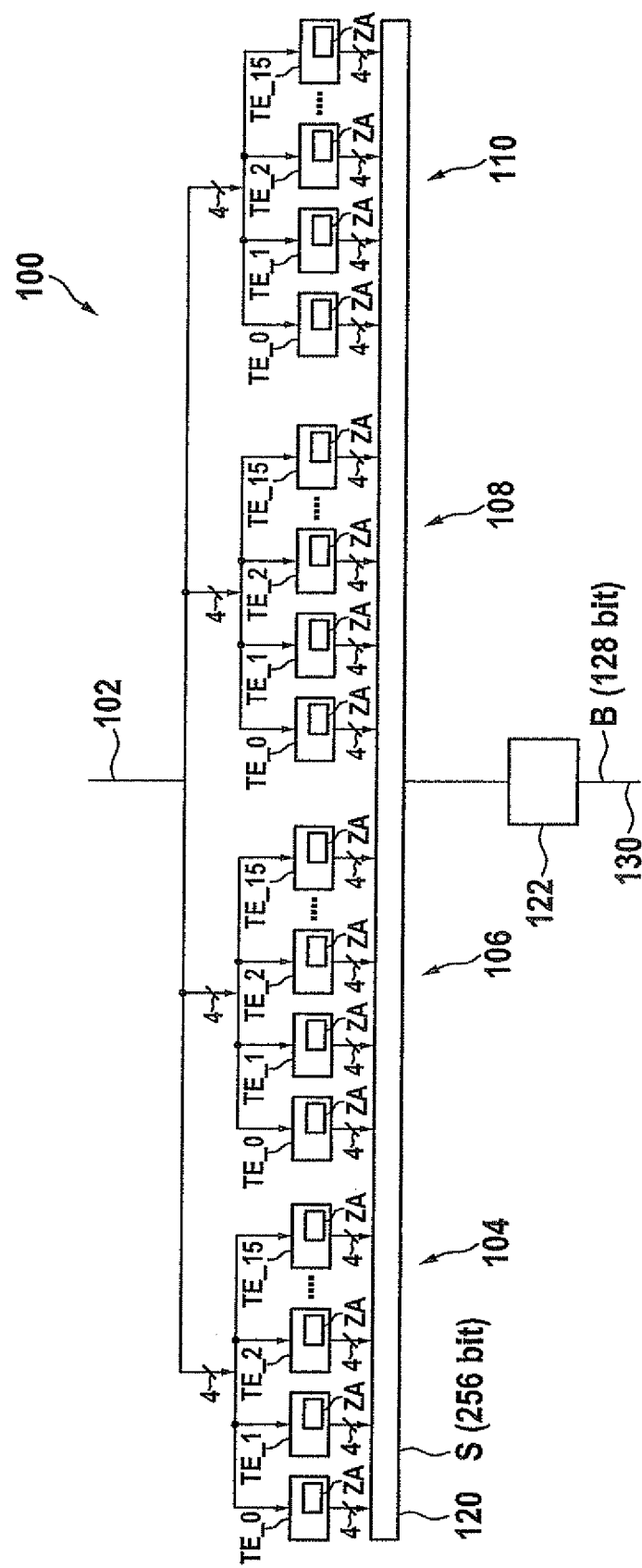
FIG. 1 shows a specific embodiment of the circuit configuration.

The exemplary embodiments and/or exemplary methods of the present invention is illustrated schematically in the drawings on the basis of specific embodiments and is described in detail below with reference to the drawings.

FIG. 1 schematically shows a specific embodiment of a circuit configuration according to the present invention, which is labeled on the whole with reference numeral 100. This circuit configuration 100 is used to form a bit vector having 128 bits from an input signal 102. For this purpose, circuit configuration 100 includes four configurations 104, 106, 108 and 110, each having sixteen transformation elements TE_0, TE_1, TE_2, . . . , TE_15. For the sake of simplicity, FIG. 1 shows only four of the sixteen transformation elements TE_0, TE_1, TE_2, . . . , TE_15. In this embodiment, circuit configuration 100 is designed in such a way that the same input data or same input signal 102 are/is sent to each transformation element TE_0, TE_1, TE_2, . . . , TE_15 of each configuration 104, 106, 108 and 110.

It is important that all transformation elements TE_0, TE_1, TE_2, . . . , TE_15 are similarly connected to the input signals in each configuration 104, 106, 108, 110, but different configurations may be different from one another.

Transformation elements TE_0, TE_1, TE_2, . . . , TE_15 form an output signal, which is not specified further in the present case, from input signal 102 supplied to them. These output signals are combined and then receive a signature S 120 having 256 bits. Transformation elements TE_0, TE_1, TE_2, . . . , TE_15 each have a state machine ZA, whose state information is stored in the form of a digital data word of predefinable length, for example. State machine ZA may have a memory capacity of 4 bits, for example, thus permitting a total of 16 different states.

State machines ZA of one configuration 104, 106, 108, 110 are each designed similarly. "Similar" means that each state machine ZA will assume the same following state in a subsequent processing cycle as another similar state machine ZA, starting from identical input signals 102 and an identical initialization state.

It is also provided that each state machine ZA has a different state than all other state machines ZA of corresponding configurations 104, 106, 108 or 110. This therefore makes DPA attacks difficult, which attempt to draw inferences about an internal processing state of circuit configuration 100 or of individual transformation elements TE_0, TE_1, TE_2, ..., TE_15 from an analysis of the electrical power consumption or from interference emissions.

It is advantageous if the number of transformation elements TE_0, TE_1, TE_2, ..., TE_15 provided corresponds to the number of maximum possible different states of state machine ZA, namely sixteen in this case. Therefore, each theoretically possible state always occurs, i.e., in each processing cycle, in exactly one state machine ZA, so that only one combination of all sixteen possible states is "visible" to the outside, i.e., to a possible attacker conducting a DPA attack.

In a subsequent processing cycle, in which individual state machines ZA each change their state according to a predefined rule, there is again on the whole exactly one of the sixteen possible states in each of sixteen state machines ZA, so that all sixteen states are again "visible" toward the outside at the same time.

As a result, a possible attacker cannot infer a state of the internal signal processing in transformation elements TE_0, TE_1, TE_2, ..., TE_15 from a corresponding electromagnetic emission, which is given in a conventional implementation of circuit configuration 100 or from the electrical power consumption of circuit configuration 100. In an ideal symmetrical design of all components, the electrical power consumption is always constant, so that the electromagnetic field emitted does not undergo any significant changes in a change of state between successive processing cycles.

A bit vector 130 having 128 bits is generated from signature S 120 by a linear gating in block 122. The linear gating may be, for example, an EXOR gating or an EXNOR gating.

Figure 2:
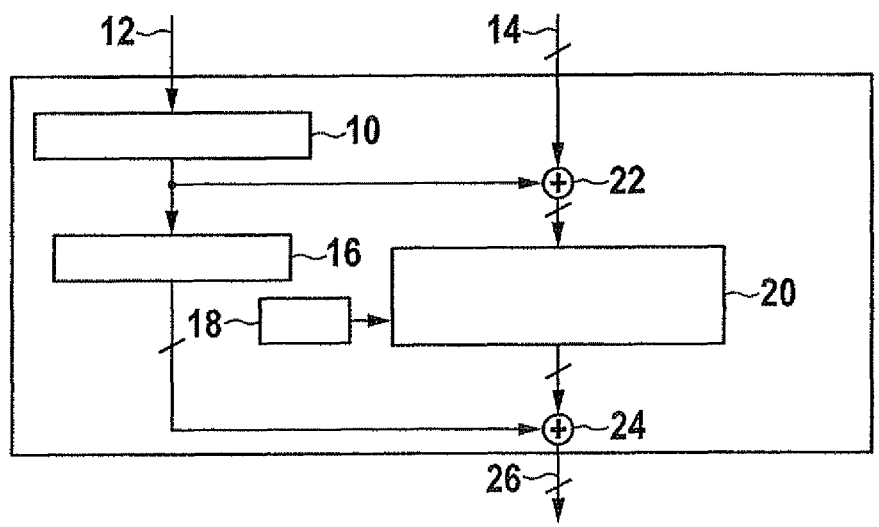
FIG. 2 shows one embodiment for masking.

The proposed method and circuit configuration 100 shown here utilize so-called nonlinear signature formation. FIG. 2 shows one possibility of masking. It shows a mask generator 10 to which up to 64 (random) input bits (input 12) are input. It is possible to select 4*16 bit values (including randomness), so that new values are taken as often as necessary. At another input 14, 128 bits of plain text are input. In addition, the diagram shows a block 16 for rotation of some bits, a key 18 (key 1), a block 20 for an encryption/decryption according to AES, a first EXOR element 22 and a second EXOR element 24. A 128-bit secret text is then output at an output 26.

The inputs and outputs of an encryption operation are thus masked by bitwise EXOR gating. It is also possible here to generate and use different masks for input and output.

Figure 3:
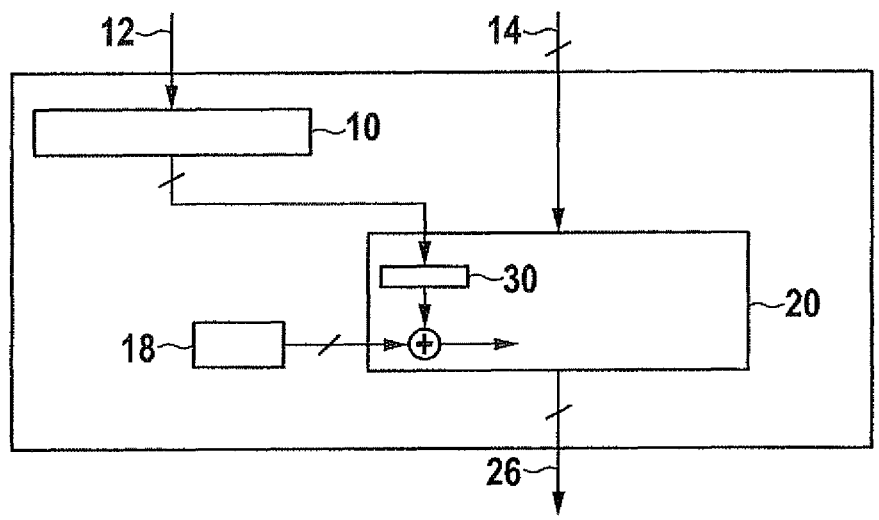
FIG. 3 shows another embodiment for masking.

FIG. 3 shows a configuration like that in FIG. 2, but in this case a mask 30 is gated with private key 18.

The bit generator used in the state machine is based on the nonlinear multiple input shift register (NLMISR), which uses polynomials $x^4+x^3+1$ and $x^4+x+1$. The state transitions are given in Table 1, where $x_i$ denotes a state of the NLMISR, i(k) denotes the NLMISR input bit, and y denotes the input which is used to switch between the polynomials.

TABLE 1

| Bit | Expression |
| --- | --- |
| $x_0$ | $i(0) \oplus x_3$ |
| $x_1$ | $i(1) \oplus x_0 \oplus yx_3$ |
| $x_2$ | $i(2) \oplus x_1$ |
| $x_3$ | $i(3) \oplus x_2 \oplus \bar{y}x_3$ |

Figure 4:
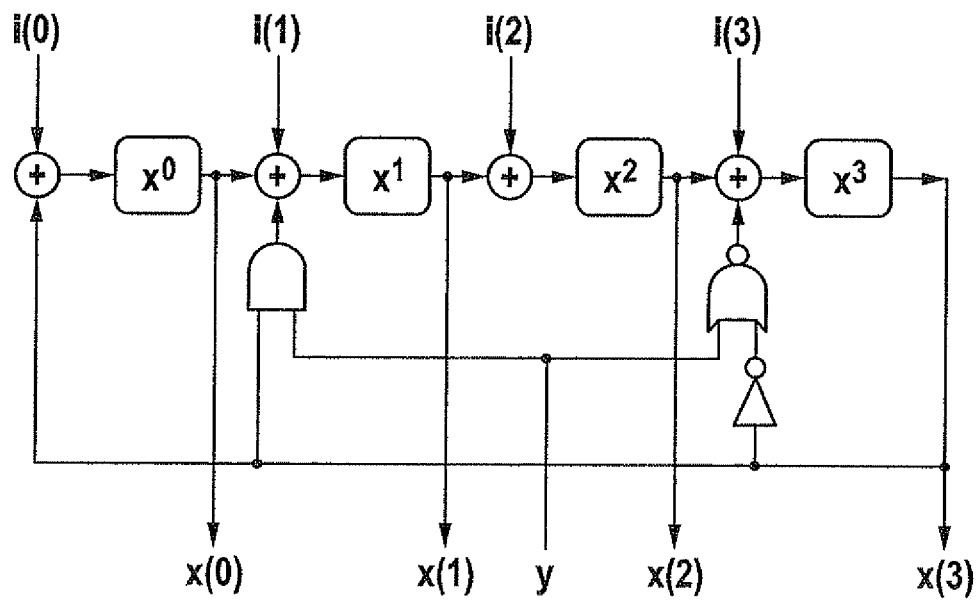
FIG. 4 shows a nonlinear multiple input shift register.

FIG. 4 shows a 4-bit NLMISR. Polynomial $x^4+x^3+1$ or $x^4+x+1$ is selected, depending on input y. Sixteen NLMISR instances are thus combined to form a module, which is shown in FIG. 6.

Figure 5:
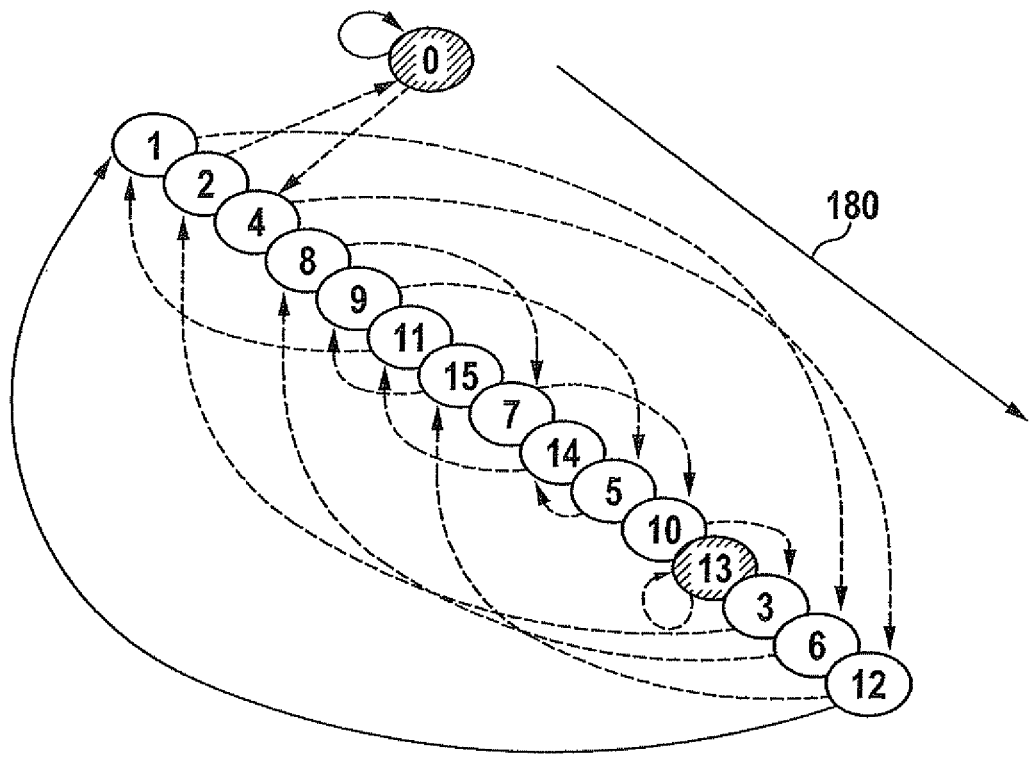
FIG. 5 shows state transitions.

FIG. 5 shows the state transitions of the state machines used. A solid-line arrow indicates a transition for i(2)=0, where a direct transition diagonally to the lower right is also possible in this case, as indicated by arrow 180 at the right. A dotted-line arrow stands for i(2)=1, where i(0)=i(1)=i(3)=0.

Figure 6:
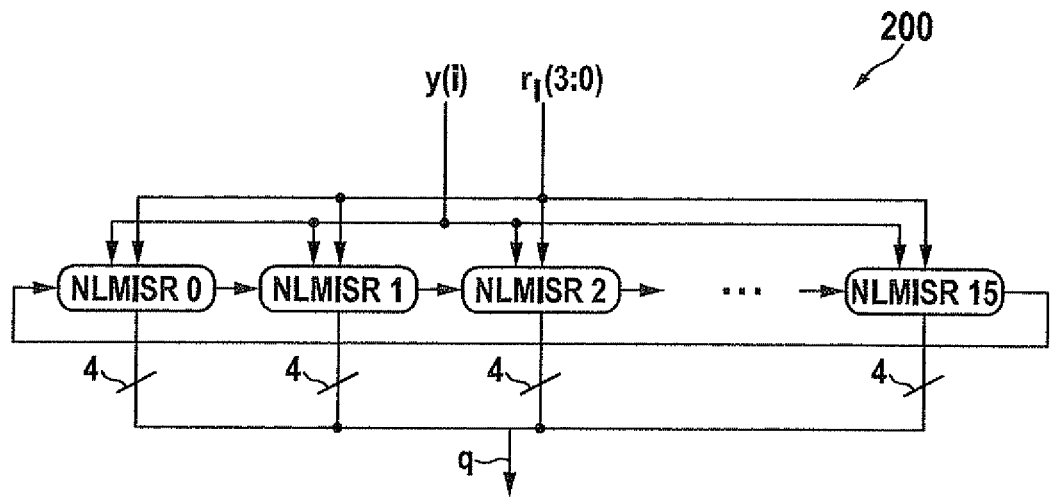
FIG. 6 shows a complete set of state machines.

FIG. 6 illustrates a complete set of state machines, which form a module 200. This module has a 4-bit input $r_i(3:0)$, four switching values y(i) and a 64-bit output q. The bits of q are driven by the flip-flops of the NLMISR circuits. Module 200 may be one of configurations 104, 106, 108 or 110 from FIG. 1.

Figure 7:
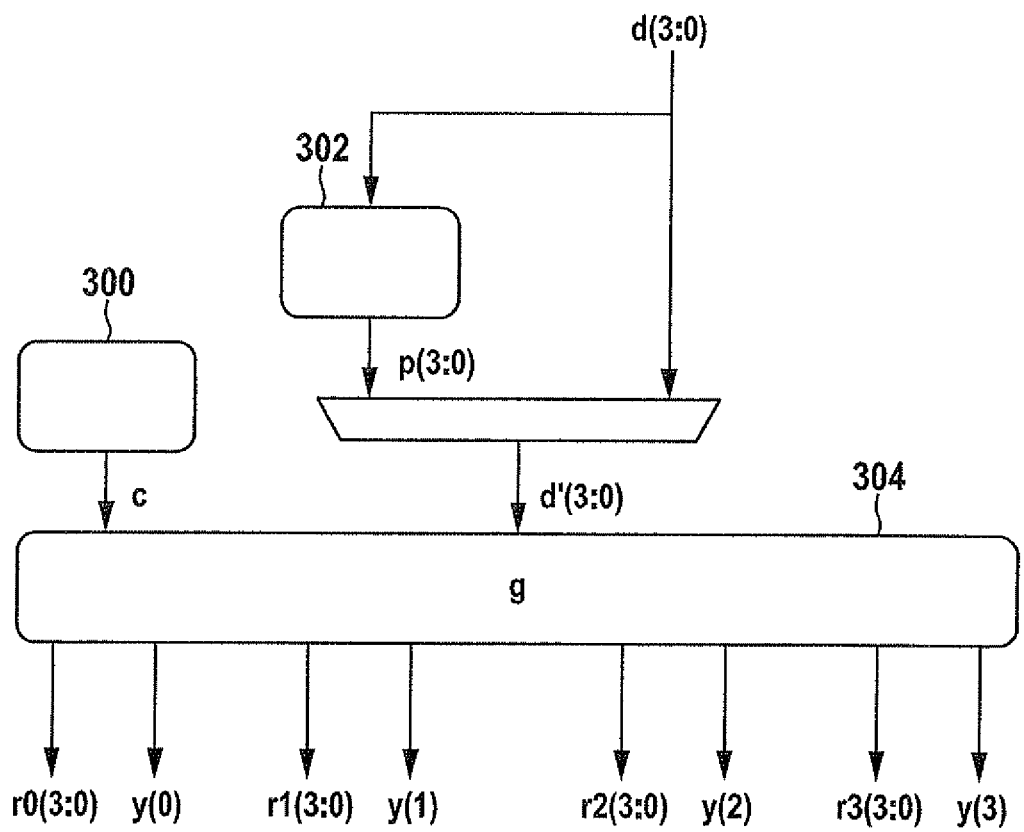
FIG. 7 shows an input stage of a bit generator.

FIG. 7 shows the input stage of the proposed bit generator. To prevent compensation of different inputs, a counter 300 is used in the input stage. To prevent a constant input, a generator 302 is inserted into the input stage for an odd parity. This generator 302 calculates odd parity vector p(3:0) for five successive 4-tuple inputs $d_i(3:0)$, ... $d_{i+3}(3:0)$. Parity vector p(3:0) is then used as the input for function g 304.

If d'(3:0) denotes a 4-bit input for function g, then value y(i) for the polynomial switching of the NLMISR instances of instance i is calculated according to Table 2.

Table 2 shows the switching bits.

TABLE 2

| Bit | Expression |
| --- | --- |
| y0 | d'(1) ⊕ d'(2) ⊕ d'(3) |
| y1 | d'(0) ⊕ d'(2) ⊕ d'(3) |
| y2 | d'(0) ⊕ d'(1) ⊕ d'(3) |
| y3 | d'(0) ⊕ d'(1) ⊕ d'(2) |

Function g is described in Table 3.

TABLE 3

| $r_i(3:0)$ | $r_i(3)$ | $r_i(2)$ | $r_i(1)$ | $r_i(0)$ | y(i) |
| --- | --- | --- | --- | --- | --- |
| $r_0(3:0)$ | $\overline{c(3)}$ | $\overline{c(2)}$ | d'(1) | d'(0) | y(0) |
| $r_1(3:0)$ | $\overline{c(0)}$ | $\overline{c(1)}$ | $\overline{d'(3)}$ | $\overline{d'(2)}$ | y(1) |
| $r_2(3:0)$ | $\overline{d'(2)}$ | $\overline{c(3)}$ | $\overline{c(0)}$ | $\overline{d'(1)}$ | y(2) |
| $r_3(3:0)$ | $\overline{c'(1)}$ | $\overline{d'(0)}$ | $\overline{c(2)}$ | d'(3) | y(3) |

Table 4 shows how output bits are gated via an EXOR. $C_0(63:0)$ is the output of configuration 104, $C_1(63:0)$ is the output of configuration 106, etc.

TABLE 4

| Bit | Expression |
| --- | --- |
| m(16i + 0) | $C_0(8i + 0) \oplus C_2(8i + 0)$ |
| m(16i + 1) | $C_0(8i + 1) \oplus C_2(8i + 4)$ |
| m(16i + 2) | $C_0(8i + 2) \oplus C_3(8i + 0)$ |

TABLE 4-continued

| Bit | Expression |
|---|---|
| m(16i + 3) | $C_0(8i + 3) \oplus C_3(8i + 4)$ |
| m(16i + 4) | $C_0(8i + 4) \oplus C_2(8i + 1)$ |
| m(16i + 5) | $C_0(8i + 5) \oplus C_2(8i + 5)$ |
| m(16i + 6) | $C_0(8i + 6) \oplus C_3(8i + 1)$ |
| m(16i + 7) | $C_0(8i + 7) \oplus C_3(8i + 5)$ |
| m(16i + 8) | $C_0(8i + 0) \oplus C_2(8i + 2)$ |
| m(16i + 9) | $C_0(8i + 1) \oplus C_2(8i + 6)$ |
| m(16i + 10) | $C_0(8i + 2) \oplus C_3(8i + 2)$ |
| m(16i + 11) | $C_0(8i + 3) \oplus C_3(8i + 6)$ |
| m(16i + 12) | $C_0(8i + 4) \oplus C_2(8i + 3)$ |
| m(16i + 13) | $C_0(8i + 5) \oplus C_2(8i + 7)$ |
| m(16i + 14) | $C_0(8i + 6) \oplus C_3(8i + 3)$ |
| m(16i + 15) | $C_0(8i + 7) \oplus C_3(8i + 7)$ |

Table 5 shows how rotational values z(0) to z(3) are calculated. All operations mod16 are calculated.

TABLE 5

| c | for c = 0, 4, 8, 12 | for $c_2$ = 1, 5, 9, 13 | for c = 2, 6, 10, 14 | for c = 3, 7, 11, 15 | Condition y(i) |
|---|---|---|---|---|---|
| $z_0$ | $z_0 + 1$ | $z_0 + 2$ | $z_0 + 4$ | $z_0 + 8$ | for y(0) = 1 |
| $z_1$ | $z_1 + 2$ | $z_1 + 4$ | $z_1 + 8$ | $z_1 + 1$ | for y(1) = 1 |
| $z_2$ | $z_2 + 8$ | $z_2 + 1$ | $z_2 + 2$ | $z_2 + 4$ | for y(2) = 1 |
| $z_3$ | $z_3 + 4$ | $z_3 + 8$ | $z_3 + 1$ | $z_3 + 2$ | for y(3) = 1 |

Figure 8:
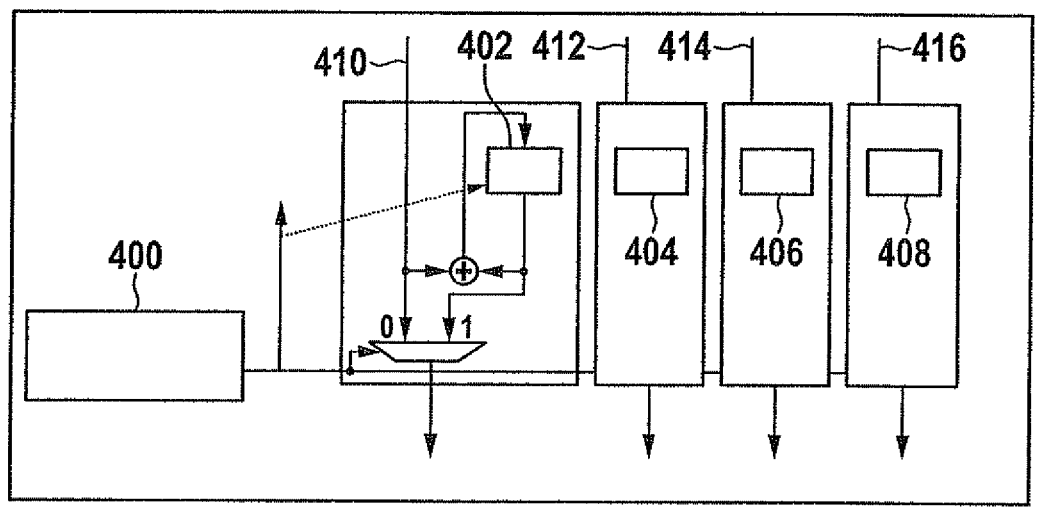
FIG. 8 shows the generation and insertion of parity bits.

FIG. 8 shows the creation and insertion of parity bits. This representation shows a 5-bit counter 400, a first flip-flop 402, a second flip-flop 404, a third flip-flop 406 and a fourth flip-flop 408.

To support the nonlinearity of NLMISR, a parity bit is generated for each input signal for all five input bits. An odd parity bit is generated for inputs d0 410, d1 412, d2 414 and d3 416. The four parities (p0, p1, p2, p3) are each inserted into the input stream between the fifth and sixth input vectors, between the tenth and eleventh input vectors and between the fifteenth and sixteenth input vectors (d(0), d(1), d(2), d(3)) (see Table 6). FIG. 8 illustrates how the parity is generated and may be used and inserted.

In providing input signals for mask generation, it is assumed that all 32 input bits have different meanings. The first 32 bits in register DMASK_IN_0 are considered as a random value d1, while the content of input register DMASK_IN_1 is assumed to be a random value d2, as shown below.

d1=d1(31:0)=d1$_{31}$ . . . d1$_0$=IN0(31:0)
d2=d2(31:0)=d2$_{31}$ . . . d2$_0$=IN1(31:0)

The meaning of the input value may vary, depending on the function used.

For the construction of all state machines, inputs i0, i1, i2 and i3 in FIG. 4 are replaced by modified inputs d'(0), d'(1), d'(2), d'(3) having the inserted odd parities after five input values each. See Table 6 in this regard.

To make each mask bit depend on the average on as many bits as possible of the initial state of a configuration 200, a rotation of states within a configuration is provided.

However, one particular feature must be taken into account for this rotation. Even if the number of ones and zeros in an NLMSIR structure is by definition always the same, the power consumption in the shift or rotation depends on the distribution of bits. For example, if there are 32 zeros and 32 ones in succession, the power consumption will be different than if zeros and ones are always alternating. The Hamming distance problem plays a role here. An attacker could utilize this information.

Therefore, in a shift or rotation, the previous state must always be reset first before writing the new value. For this reason, a shift operation is always performed in four cycles. Each flip-flop of state machine NLMISR is therefore constructed of two resettable latches (component of a standard library). The two latches are triggered in succession: first, the master latch is reset (RM), then the input value is stored therein (CM). Next the slave is reset and then the value is transferred from the master to the slave. Since four cycles are needed for each, it is proposed that the four bits of a state machine NLMISR be transmitted in parallel in the rotation.

With 16 shift operations of four cycles each, the initial state would again be reached. The four control signals should switch at the same time for all NLMISRs. These signals may be supplied centrally (in which case they are then treated like clock signals) or they may also be generated on-site from the clock signal.

In the latter case, only the clock signal need be applied synchronously. During rotation, all the outputs which go externally to the gating elements are to be turned off (e.g., set at 0 by gating with an AND or a NOR).

If the masking vector is formed in 16-bit portions, for example, it should be noted that all unused outputs of the NLMISR structure must drive the same load as the active outputs: in other words, suitable gates and lines or individual transistors or other capacitances are to be applied to the unused outputs.

As a rule, the outputs of the XORs are no longer to be regarded as critical in the sense of attackable. An attacker would have to formulate hypotheses for all the initial states used. Since a masking bit m(i) depends on the average on all the bits of the secret initial state due to the proposed rotation,

TABLE 6

| time | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| d'(0) | $d1_0$ | $d1_4$ | $d1_8$ | $d1_{12}$ | $d1_{16}$ | $p0_5$ | $d1_{20}$ | $d1_{24}$ | $d1_{28}$ | $d2_0$ | $d2_4$ | $p0_{11}$ | $d2_8$ | $d2_{12}$ | $d2_{16}$ | $d2_{20}$ | $d2_{24}$ | $p0_{17}$ | $d2_{28}$ |
| d'(1) | $d1_1$ | $d1_5$ | $d1_9$ | $d1_{13}$ | $d1_{17}$ | $p1_5$ | $d1_{21}$ | $d1_{25}$ | $d1_{29}$ | $d2_1$ | $d2_5$ | $p1_{11}$ | $d2_9$ | $d2_{13}$ | $d2_{17}$ | $d2_{21}$ | $d2_{25}$ | $p1_{17}$ | $d2_{29}$ |
| d'(2) | $d1_2$ | $d1_6$ | $d1_{10}$ | $d1_{14}$ | $d1_{18}$ | $p2_5$ | $d1_{22}$ | $d1_{26}$ | $d1_{30}$ | $d2_2$ | $d2_6$ | $p2_{11}$ | $d2_{10}$ | $d2_{14}$ | $d2_{18}$ | $d2_{22}$ | $d2_{26}$ | $p2_{17}$ | $d2_{30}$ |
| d'(3) | $d1_3$ | $d1_7$ | $d1_{11}$ | $d1_{15}$ | $d1_{19}$ | $p3_5$ | $d1_{23}$ | $d1_{27}$ | $d1_{31}$ | $d2_3$ | $d2_7$ | $p3_{11}$ | $d2_{11}$ | $d2_{15}$ | $d2_{19}$ | $d2_{23}$ | $d2_{27}$ | $p3_{17}$ | $d2_{31}$ | an attacker would not have any chance because of the great number of hypotheses required. If this case were not applicable, the complementary bit for each mask bit could always be generated by similar XNOR elements and the bits could be processed further jointly.

A suitable type of implementation of the present invention provides for all the state machines to be implemented as reiterated layout structures. All input and control signals should reach the state machines at the same point in time. All the outputs should have the same load. During the rotation and the calculation operations, the outputs should be zero.

For example, if a state machine had a delayed input, an attacker might discover by using a DPA which states were assumed in this state machine during the generation procedure when the input signals were assumed. The present state and thus also the initial state could thus be ascertained by an attack.

The same considerations also apply to the input signals and the switching of the connected combinatory circuits. Two critical method steps are to be taken into account, namely when the rotation is performed and when the outputs are activated. Synchronous switching is necessary for both steps to prevent a successful attack. The output need be driven then only if the state machines are stable and are switched synchronously.

Accurate routing of the cycle for all components is therefore indispensable. If, in addition, the input signal delay is not to be differentiated for an attacker, the reiterated layout cells should not be necessary.

What is claimed is:

1. A method for generating a bit vector, the method comprising:
   sending an input signal to an input end of each of at least two configurations, each configuration having a plurality of state machines, and each state machine having the same structure, wherein:
      each state machine transitions to a next state in a predefined sequence of states as a function of its present state and a value of its present input, and
      each state machine maintains the next state until a subsequent processing cycle;
   generating an output signal for each of the state machines as a function of their state, each of the state machines within any particular configuration always having a different state than the other state machines of the same particular configuration;
   generating a bit vector by a linear gating of the output signals of the state machines of different configurations; and
   masking at least one of an input that is encrypted by an encryption operation and an encrypted output of the encryption operation using the bit vector.

2. The method of claim 1, wherein the states of the state machine are rotated.

3. The method of claim 2, wherein a power consumption in rotation is independent of preceding states and following states due to erasing and subsequent writing.

4. The method of claim 1, wherein the same input signal is sent to each of the configurations.

5. The method of claim 4, further comprising:
   supplying a first counter value, wherein different ones of the at least two configurations process the input signals and counter signals in different ways.

6. The method of claim 1, wherein switching signals are formed from the input signals, wherein the state machines attain a different following state as a function of the switching signals, and wherein the switching signals are formable differently for different ones of the configurations.

7. The method of claim 1, wherein the bit vector is formed by gating different outputs of different ones of the state machines of different ones of the configurations.

8. The method of claim 1, wherein the bit vector is logically combined with the input of the encryption operation prior to performing the encryption.

9. The method of claim 1, wherein the output of the encryption operation is masked by logically combining the bit vector with a private key used to perform the encryption.

10. The method of claim 1, wherein:
    the number of state machines in any particular configuration is equal to the number of possible states for any particular state machine of the same particular configuration, and
    within each particular configuration, each possible state always occurs within exactly one state machine.

11. The method of claim 1, wherein the inputs by which the state machines transition to the next state are identical.

12. The method of claim 1, further comprising:
    initializing all of the state machines within any particular configuration to different states.

13. A circuit configuration for generating a bit vector, comprising:
    at least two configurations, each configuration having a plurality of state machines, and each state machine having the same structure, to whose inputs an input signal, which is the same or different, is sent, wherein:
      each of the at least two configurations each generate an output signal as a function of their state,
      each of the state machines in any particular configuration always has a different state than the other state machines of the same particular configuration,
      each state machine transitions to a next state in a predefined sequence of states as a function of its present state and a value of its present input, and
      each state machine maintains the next state until a subsequent processing cycle;
    a linear gating element that forms a bit vector by gating the output signals of the state machines; and
    an additional gating element that masks at least one of an input that is encrypted by an encryption operation and an encrypted output of the encryption operation using the bit vector.

14. The circuit configuration of claim 13, wherein the memory elements of the state machines are constructed of two parts, including a master and a slave, which are erasable and writable independently of one another.

15. The circuit configuration of claim 13, which is configured so that the outputs of all of the state machines, which are not connected to a gating element, are connected to a load element.

16. The circuit configuration of claim 13, wherein the linear gating element is for gating the output signals of the state machines of different ones of the configurations for generating the bit vector.

17. The circuit configuration of claim 13, wherein:
    the number of state machines in any particular configuration is equal to the number of possible states for any particular state machine of the same particular configuration, and
    within each particular configuration, each possible state always occurs within exactly one state machine.

* * * * *